UNITED STATES PATENT OFFICE.

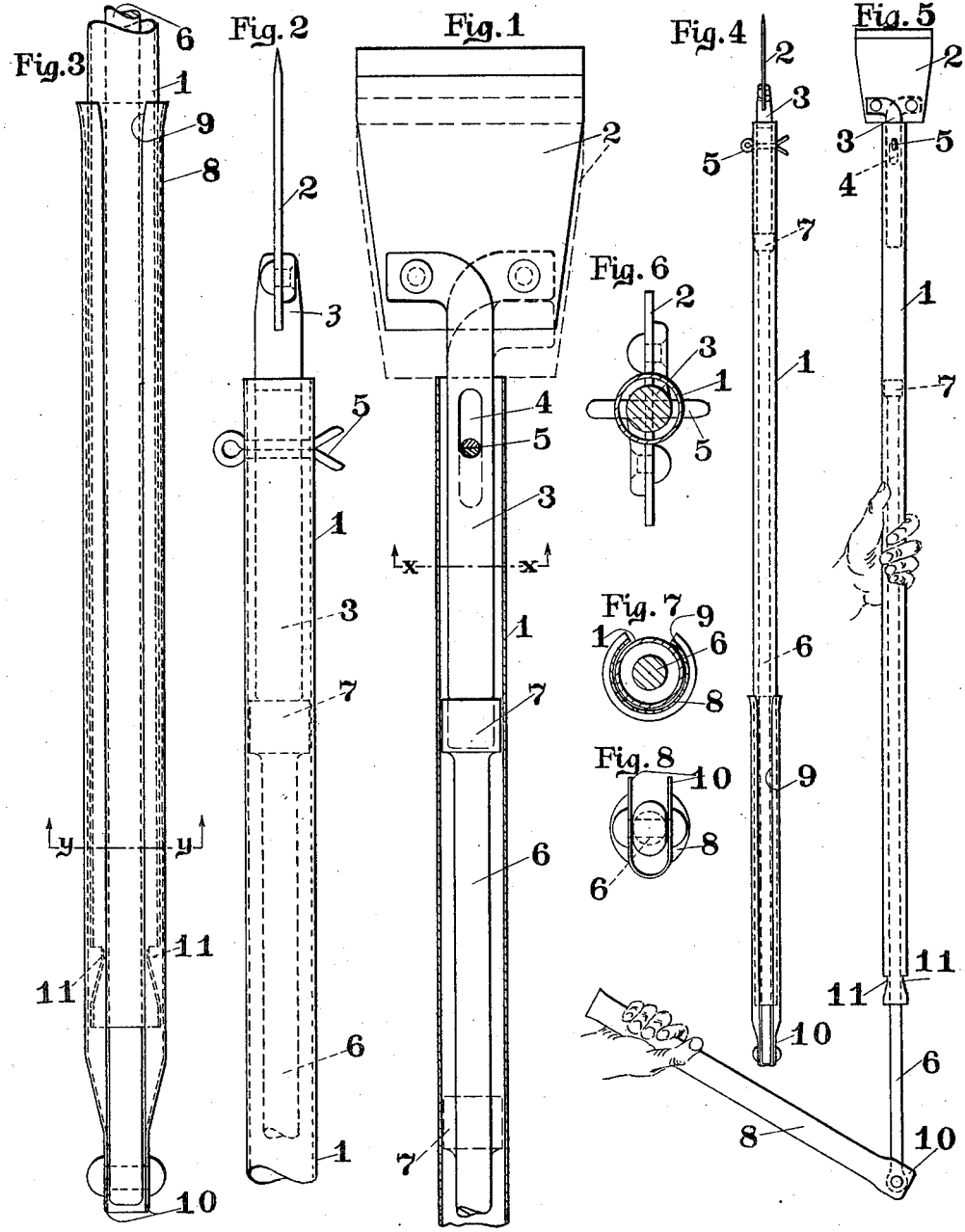

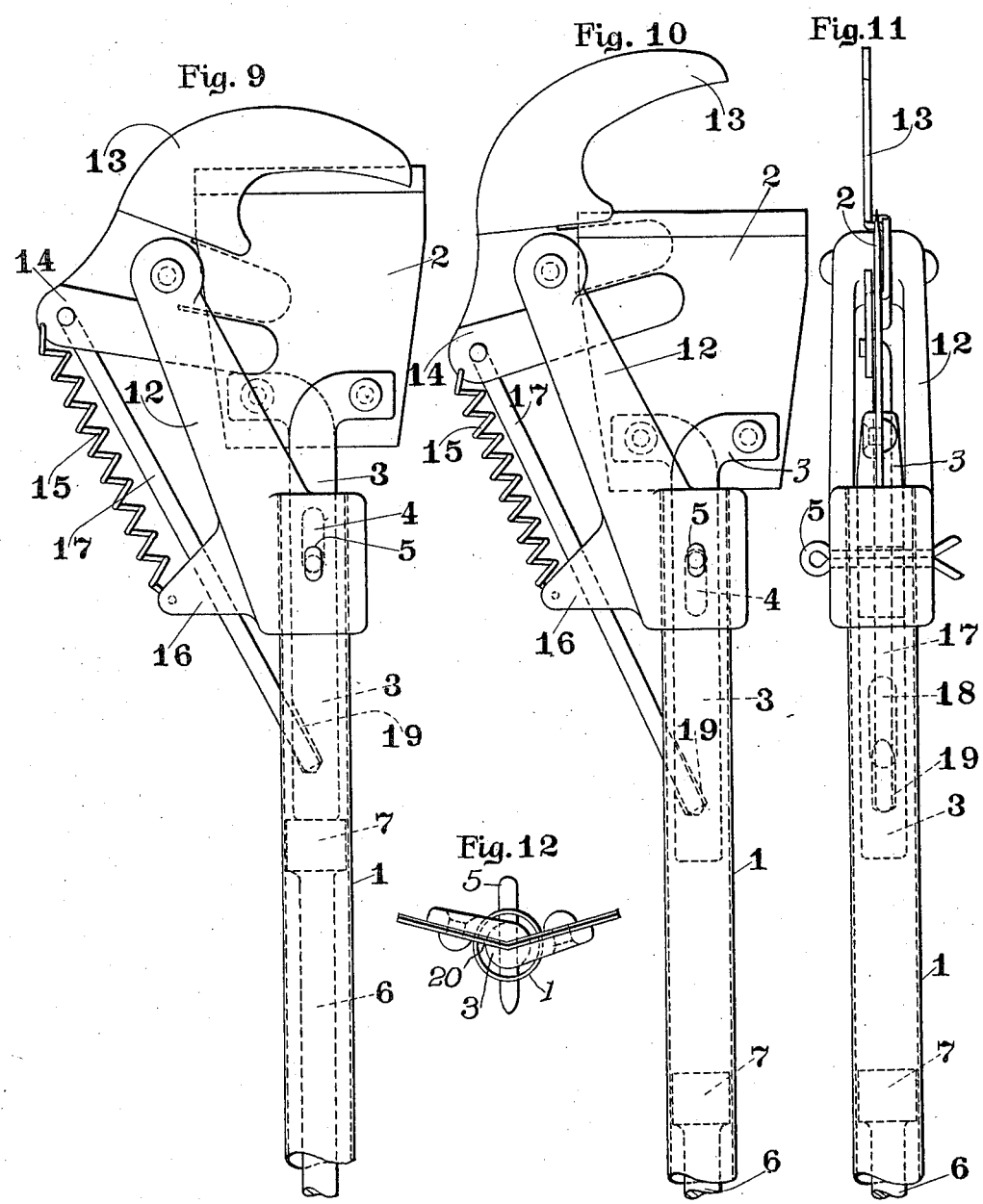

WILLIAM D. BAYLEY AND WILLIAM BAYLEY, OF SPRINGFIELD, OHIO.

PRUNING DEVICE.

1,032,370.  Specification of Letters Patent.  Patented July 16, 1912.

Application filed April 1, 1910. Serial No. 552,864.

*To all whom it may concern:*

Be it known that we, WILLIAM D. BAYLEY and WILLIAM BAYLEY, citizens of the United States, residing at Springfield, in the county of Clark and State of Ohio, have invented certain new and useful Improvements in Pruning Devices, of which the following is a specification, reference being had therein to the accompanying drawings.

This invention relates to pruning devices and is designed more particularly for trimming trees.

The object of the invention is to provide a device of this character with which branches or small limbs may be quickly and easily removed without injury to the tree; which will be of such a character that it can be easily carried by the operator as he moves from one position to another either on the ground or in the tree and can be used by him from practically any position he may be obliged to assume in order to reach the particular branch which it is desired to remove; to so construct the operating mechanism for the device that a long powerful stroke may be imparted to this mechanism with a comparatively small movement of the hand of the operator; to so construct the implement that the blow of the hammer will have to lift only the weight of the knife which is very light, thereby enabling substantially the entire force of the blow to be utilized for cutting purposes; to so construct the implement that the body portion thereof will not be subjected to strain of any character, and consequently, may be made of very light weight; and further, to provide such a device which can be manufactured at a low cost and will be of a strong, durable construction, the several parts of which are of such a character and so arranged that they will not be easily broken or disarranged.

In the accompanying drawings, Figure 1 is a longitudinal, sectional view of one end of a device embodying our invention, showing the cutter and the operating device therefor in elevation; Fig. 2 is a side elevation of what is shown in Fig. 1; Fig. 3 is a side elevation of the lower portion of such a device; Fig. 4 is a side elevation, on a smaller scale, of the complete device in its folded position; Fig. 5 is a front elevation of the same in its extended or operative position; Fig. 6 is a transverse, sectional view, taken on the line $x\ x$ of Fig. 1 and looking in the direction of the arrows; Fig. 7 is a transverse, sectional view taken on the line $y\ y$ of Fig. 3 and looking in the direction of the arrows; Fig. 8 is a bottom plan view of the device in its folded position; Fig. 9 is a front elevation of a modified form of the device, showing the blades in the position occupied by them at the end of the cutting movement; Fig. 10 is a similar view showing the blades in the position occupied by them at the beginning of the cutting movement; Fig. 11 is a side elevation of what is shown in Fig. 10; and Fig. 12 is a top, plan view of the device with a modified form of cutter.

In these drawings we have illustrated two forms of our invention. In both of these forms the device comprises a body portion having a cutter slidably mounted on one end and a hammer or actuating device guided thereby and operated from the opposite end thereof. The form shown in Figs. 1 to 8, inclusive, is designed more particularly for removing branches or small limbs at points close to the trunk of the tree or the larger limb from which the branch grows, the trunk or limb serving to prevent any considerable amount of movement of the branch which is being cut under the force of the blow. That form of the device shown in Figs. 9 to 12 is designed more particularly for removing small branches at points removed from the trunk of the tree or the large limbs from which they diverge. Inasmuch as the ends of the branches are not rigidly supported we have, in this form of the device, provided a finger or blade coöperating with the cutter, which, in the present instance, is in the form of an attachment for the device shown in Figs. 1 to 8. As shown in these drawings the device or implement comprises a hollow body portion 1 of any suitable character, but which may be conveniently constructed from a section of metal pipe. Movably mounted at one end of the body portion 1 is a cutter such as the flat blade 2. This blade may be connected to the body portion in any approved manner, but we have, in the present instance, shown the same as having a shank 3 which enters the hollow body portion 1 and is slidably mounted therein. Suitable means are provided for limiting the outward movement of the shank without interfering with the free sliding movement thereof. To this end the shank 3 is provided with a slot 4 through which extends a pin or projection 5 which is rigidly secured to the body portion 1. This pin or projection 5 is here shown as a split key which extends through the side walls of the body portion 1 and through the slot 4 in the shank 3 of the cutter. Such a split key forms a strong positive stop for the cutter and may be easily withdrawn to permit the removal of the cutter. The character of the cutter employed and the manner in which it is mounted on the body portion of the implement may, obviously, be varied, and it is not essential that the cutter shall be so mounted as to move relatively to the body portion.

A suitable actuating device or hammer is provided for imparting movement to the cutter 2. In the form of the device here shown this actuating device is slidably mounted in the tubular body portion 1 and comprises a rod 6 having an enlarged head 7 adapted to engage the adjacent end of the shank 3 of the cutter. Both the head 7 of the actuating device and the shank 3 of the cutter are hardened to prevent the same from being battered out of shape. The rod 6 and its enlarged head 7 constitute a hammer which may be operated from that end of the body portion 1 opposite the cutter 2. This operation is preferably accomplished by means of a handle 8 which is pivotally connected to the lower end of the rod 6 and is of such a length that a long powerful movement may be imparted to the hammer with a comparatively small movement of the hand of the operator. This particular characteristic of the actuating mechanism for the cutter is an important one in that by means of it the operator is enabled to impart to the hammer a stroke of the desired length and force when occupying positions in which it is difficult or impossible to have the free use of his arm. With this form of actuating device a wrist movement is all that is necessary to actuate the hammer with sufficient force to remove the branch. Obviously, the hammer could be actuated without the use of the handle 8, but a stroke of the desired force and length could not be so easily obtained. The handle 8 is of such a character that it will fold upon the rod 6 of the hammer and upon the body portion 1 of the implement and will be retained in its folded position, thus rendering the implement of a compact form which enables it to be readily carried by the operator as he moves from position to position in the tree. To this end the handle 8 is hollow and has a slot 9 extending throughout its length. This slot is of sufficient size to permit the rod 6 to pass through the same. That end of the handle 8 which is secured to the rod 6 is flattened, as shown at 10, and the rod 6 is pivotally secured thereto in such a position that when the handle has been moved into a position parallel with the rod 6 and this rod is within the handle, the rod will occupy a position centrally thereof. The tubular handle 8 is of such a size that it will fit over or telescope the adjacent end of the body portion 1 of the implement and it fits snugly about this body portion so that the friction between the parts is sufficient to prevent movement of the handle relative to the body portion of its own weight. In making the device we prefer to form the handle 8 of a tube of the same diameter as that employed for the body portion. This tube is spread by inserting a plug or wedge into the same to open its seam sufficiently to form the slot 9 and to increase the diameter of the tube sufficiently to enable it to extend over the end of the body portion. The entrance of the wedge into the end of the handle causes the upper end thereof to flare slightly and cause the handle to be tapered toward its point of connection to the rod 6. This shape of the handle enables it to be readily passed over the end of the body portion, and by forcing the same over the end of the body portion different distances, different degrees of friction may be secured so that the handle may be held in place lightly and may be readily removed by the operator when he has reached the position in which he desires to use the implement, or the handle may be secured so firmly to the body portion that considerable force will be necessary to remove it, this latter condition being desirable when the device is packed for shipping. The lower end of the body portion 1 is provided with a suitable stop to prevent the hammer from being entirely withdrawn therefrom. As here shown the side walls of the body portion are struck inwardly, as indicated at 11, near the lower end thereof and form stops which engage the head 7 of the hammer to limit its downward movement.

The operation of the implement will be readily understood and it will be apparent that by placing the edge of the cutter against a branch and then actuating the hammer to impart a smart blow to the end of the shank 3 the cutter will be moved relatively to the body portion and will be forced through the branch, thus completely severing the same from the trunk or limb of the tree.

In that form of the implement shown in Figs. 9 to 11 we have provided a finger or blade coöperating with the cutter 2 after the manner of shearing blades. This attachment enables the implement to be used for removing small branches or twigs growing at points removed from the larger branches or trunk of the tree and therefore without a sufficiently rigid support to enable the cutter 2 to be employed alone. This attachment, as here shown, comprises an arm 12 rigidly secured to that end of the body portion 1 to which the cutter 2 is secured. This arm extends upwardly to a point near and at one side of the edge of the cutter when the same is in its normal or retracted position. A finger or blade 13, which may or may not be sharpened, is pivotally mounted on the upper end of the arm and is so arranged as to extend across the line of movement of the cutter 2. The finger 13 has a portion projecting beyond its pivotal center, as indicated at 14, and this portion of the finger is connected by means of a spring 15 with a projection or lug 16 carried by the arm 12. This spring tends to move the finger 13 into its uppermost or inoperative position. The projection 14 of the blade 13 also has pivotally connected thereto a rod 17 which is so connected to the cutter 2 as to cause the finger 13 to be moved simultaneously with the movement of the cutter 2. In the present form of the device we have accomplished this by forming a slot 18 in the side of the body portion 1 and providing the shank 3 of the cutter with an inclined recess 19 adapted to receive the end of the rod 17. Consequently, when the end of the rod is in the recess 19 the upward movement of the shank 3 under the impact of a blow from the hammer will impart movement to both the cutter 2 and the finger 13, moving these parts from the position shown in Fig. 10 to that shown in Fig. 9. As soon as the cutting stroke is completed and the hammer retracted the spring 15 will move both the finger 13 and the cutter 2 to their normal positions.

In Fig. 12 of the drawings we have shown the device as provided with a modified form of cutter. This cutter comprises two members arranged at an obtuse angle one to the other and forming in effect a cutter of a very broad V-shape, as indicated at 20. By the use of such a cutter the limb can be split and the cutting action facilitated.

It will be apparent that the device, either with or without the attachment shown in Figs. 9 to 11, is of such a character that it can be readily handled by the operator from practically any position he may be forced to assume in order to reach the branch which he desires to remove and that the device can be folded into a compact form so that it can be carried without difficulty by the operator as he moves from one position to another in the tree, on the ladder or on any other supporting structure from which he may be working. Further, it will be apparent that the construction of the implement is very simple, thereby enabling it to be built at a low cost, and that the arrangement and character of the parts are such that these cannot be easily disarranged or broken.

We have herein shown and described two forms of our invention, or rather one form with and without an attachment, but it will be understood that the device or devices so shown are for the purposes of illustration only and that the essential features of the invention may be embodied in constructions other than those so shown and described. Therefore, we wish it to be understood that we do not desire to be limited to the details of construction shown and described, for obvious modifications will occur to a person skilled in the art.

Having thus fully described our invention, what we claim as new and desire to secure by Letters Patent, is:—

1. A device of the character described, comprising a body portion, a cutter movably mounted on said body portion, a hammer movably mounted on said body portion and adapted to actuate said cutter, and a handle rigid throughout its length, having one end pivotally connected to said hammer and otherwise free, whereby, when the free end of said handle is grasped by the operator, a slight movement thereof will impart a long powerful movement to said hammer.

2. A device of the character described comprising a tubular body portion, a cutter having a shank extending into one end of said tubular body portion, means to limit the movement of said cutter relatively to said body portion, a hammer slidably mounted in said body portion and having one end extending beyond the end thereof opposite said cutter, and a rod pivotally connected at one end to the outer end of said hammer, and otherwise free, to constitute a handle to actuate said hammer.

3. A device of the character described comprising a hollow body portion, a cutter having a shank extending into one end of said hollow body portion, a hammer slidably mounted in said hollow body portion, and a rod having one end pivotally connected to said hammer and otherwise free, whereby, when the free end of said handle is grasped by the operator, a slight movement thereof will impart a long and powerful movement to said hammer.

4. A device of the character described comprising a tubular body portion, a cutter having a shank extending into one end of said tubular body portion, a hammer slidably mounted in said body portion, a handle having one end pivotally connected to said hammer, said handle being arranged to fold into a position substantially parallel with said hammer and said body portion, and means to retain said handle in its folded position.

5. A device of the character described comprising a tubular body portion, a cutter having a shank extending into one end of said body portion, a hammer slidably mounted in said body portion, adapted to engage the shank of said cutter and having one end extending beyond that end of said body portion opposite said cutter, a tubular handle pivotally connected to the outer end of said hammer, having a longitudinal slot extending through one side thereof to enable the same to be folded over said hammer and adapted to telescope the adjacent end of said body portion.

6. A device of the character described comprising a tubular body portion, a cutter having a shank extending into one end of said body portion, a hammer slidably mounted in said body portion, adapted to engage the shank of said cutter and having one end extending beyond that end of said body portion opposite said cutter, a tubular handle pivotally connected to the outer end of said hammer, having a longitudinal slot extending through one side thereof to enable the same to be folded over said hammer and adapted to telescope the adjacent end of said body portion, said handle having a longitudinal taper to cause it to frictionally engage said body portion.

7. A device of the character described comprising a body portion, a cutter slidably mounted on said body portion, a hammer for actuating said cutter, a finger pivotally supported on said body portion and arranged to coöperate with said cutter, and means whereby said finger may operate simultaneously with the movement of said cutter.

8. A device of the character described comprising a hollow body portion, a cutter having a shank extending into said hollow body portion, a hammer slidably mounted in said body and adapted to engage said shank to actuate said cutter, a finger pivotally supported by said body portion and arranged to coöperate with said cutter, and means for operatively connecting said finger to the shank of said cutter.

9. A device of the character described comprising a hollow body portion, a cutter having a shank extending into said hollow body portion, a hammer slidably mounted in said body portion and adapted to engage said shank to actuate said cutter, a finger pivotally supported by said body portion and arranged to coöperate with said cutter, and a rod pivotally connected to said finger and operatively connected to the shank of said cutter.

10. A device of the character described comprising a hollow body portion having a slot in one side thereof, a cutter having a shank loosely mounted in said hollow body portion and having an inclined recess therein adjacent to the slot in said body portion, a hammer slidably mounted in said body portion and adapted to engage said shank to impart movement to said cutter, an arm supported by said body portion and extending to a point near the outer edge of said cutter, a finger pivotally mounted on said arm, arranged to coöperate with said cutter and having a projection extending beyond its point of pivotal connection to said arm, a spring connected to said projection and tending to move said finger away from said cutter, and a rod pivotally connected to said projection and extending into the recess in said shank.

In testimony whereof, we affix our signatures in presence of two witnesses.

WILLIAM D. BAYLEY.
WILLIAM BAYLEY.

Witnesses:
ELZA F. McKEE,
EDWARD L. REED.

Copies of this patent may be obtained for five cents each, by addressing the "Commissioner of Patents, Washington, D. C."